United States Patent [19]

Chang

[11] Patent Number: 5,017,665
[45] Date of Patent: May 21, 1991

[54] SUPPORTED CATALYST FOR 1-OLEFIN AND 1,4-DIOLEFIN COPOLYMERIZATION

[75] Inventor: Main Chang, Houston, Tex.

[73] Assignee: Exxon Chemical Patents Inc., Linden, N.J.

[21] Appl. No.: 385,339

[22] Filed: Jul. 25, 1989

[51] Int. Cl.$^5$ .................. C08F 4/643; C08F 236/20
[52] U.S. Cl. .................................. 526/129; 526/156; 526/160; 526/336
[58] Field of Search ............... 526/129, 156, 160, 336, 526/170

[56] References Cited

U.S. PATENT DOCUMENTS 4,808,561  2/1989  Welborn, Jr. .................. 502/104

FOREIGN PATENT DOCUMENTS

| 0206794 | 12/1986 | European Pat. Off. |
| 62-119215 | 5/1987 | Japan |
| 62-121707 | 6/1987 | Japan |
| 62-121709 | 6/1987 | Japan |
| 62-121711 | 6/1987 | Japan |
| 88/04674 | 6/1988 | PCT Int'l Appl. |

OTHER PUBLICATIONS

Chandrasekhar S. Bajgur, Wayne R. Tikkanen & Jeffrey L. Petersen-11/8/84, Synthesis, Structural Characterization, & Electrochemistry of [1]Metallocenophane Complexes, [Si(alkyl)$_2$(C$_5$H$_4$)$_2$]MCl$_2$, M=Ti, Zr, Inorg. Chem, 1985, 24, 2539-2546.

Ferdinand R. W. P Wild, Marek Wasiucionek, Gottfried Huttner & Hans H. Brintzinger, 11/14/84/, Snythesis & Crystal Structure of a Chiral ansa-Zirconocene Derivative with Ethylene-Bridged Tetrahydroindenyl Ligands-Journal of Organometallic Chemistry, 288 (1985), 63-67, Printed in the Netherlands.

Walter Kaminsky & Massoud Miri-Ethylene Propylene Diene Terpolymers Produced with a Homogeneous and Highly Active Zirconium Catalyst, Journal of Polymer Science, Polymer Chemistry Edition, vol. 23, 2151-2164.

*Primary Examiner*—Fred Teskin
*Attorney, Agent, or Firm*—M. B. Kurtzman

[57] ABSTRACT

A process using a high activity supported metallocene-alumoxane catalyst, comprising methylalumoxane and bisindenyl zirconium dichloride on a silica support, for the copolymerization of ethylene and 1,4-hexadiene to produce a copolymer having a high concentration of pendant functionalizeable groups which may also be used to cross-link the copolymer.

13 Claims, No Drawings

SUPPORTED CATALYST FOR 1-OLEFIN AND 1,4-DIOLEFIN COPOLYMERIZATION

BACKGROUND OF THE INVENTION

1. Field of the Invention

This invention relates to a process using a high activity catalyst for producing cross-linkable polymers of ethylene with 1,4-hexadiene or of ethylene with 1,4-hexadiene and a 1-olefin which have high contents of functionalizeable pendant groups and which have a narrow molecular weight and comonomer distribution.

2. Background

It is highly desirable to tailor polymers and copolymers of 1-olefins to produce products having specific desirable properties. It is known that the polymerization of ethylene with 1,4-hexadiene or the polymerization of ethylene with 1,4 hexadiene and a 1-olefin will produce a polymer having 2-butenyl free branched chains. Such a polymer has special value because it is cross-linkable through these branched chains to form a high strength crystalline composition. In addition to this cross-linkable feature, such a polymer can also be easily functionalized through the chemical reaction of the 2-butenyl branching with other chemicals to form a functionalized polyolefin.

For many end use applications polyethylene (PE) must be first treated to incorporate into the carbon-carbon backbone pendant groups containing reactive functional groups. For instance, to prepare PE to receive and retain printing, etc., the PE must be functionalized, as for example by treating it in a peroxide catalyzed reaction with maleic anhydride. A disadvantage of functionalizing PE by such a maleation reaction is that the peroxide catalyst also cross-links PE, thereby causing gel in films and the like.

As a possible alternative to the functionalization of PE by a peroxide catalyzed maleation reaction, some efforts have been directed to producing a PE copolymer having pendant groups which can be functionalized without cross-linking. Such efforts have included copolymerizing ethylene with a diolefin such as 1,4-hexadiene. Copolymerization of ethylene with 1,4-hexadiene yields a polyethylene-type carbon backbone wherein 2-butenyl groups are pendant from the carbon-carbon backbone at each site wherein a 1,4-hexadiene comonomer has been incorporated. The double bond of the 2-butenyl pendant group may be reacted with common reagents under mild conditions which will not cross-link the PE resin and thereby be readily converted to a variety of functional groups, thus providing the desired functionalized PE.

The copolymerization of ethylene with α-olefins, such as propylene, 1-butene, 1-pentene, 1-hexene, is well known and practiced for the purpose of producing a variety of PE resin types, such as linear low density polyethylene (LLDPE). The copolymerization of ethylene with α-olefins proceeds readily in the presence of Ziegler-Natta type catalysts and also the more recently developed catalyst comprising a metallocene and alumoxane. Ziegler-Natta type catalysts generally comprise a Group IVB metal compound such as Ti halide and an aluminum alkyl cocatalyst. The metallocene-containing type catalyst is one of a Group IVB metal metallocene (i.e., a coordination compound of a Group IVB metal with cyclopentadienyl ligands) cocatalyzed with alumoxane. A metallocene, especially a zirconocene, is generally not active as a catalyst when cocatalyzed with an aluminum alkyl as in the traditional Ziegler-Natta type catalyst, but a zirconocene generally has a vastly higher catalytic activity than traditional Ziegler-Natta type catalyst when cocatalyzed with an alumoxane. An advantage of the zirconocene/alumoxane catalyst system is that it catalyzes the production of ethylene and α-olefin homopolymers and copolymers to a narrower molecular weight distribution than that obtainable with traditional Ziegler-Natta type catalysts.

Attempts to utilize a Ziegler-Natta or a metallocene/alumoxane type of catalyst to copolymerize ethylene with a diolefin have heretofore been less than satisfactory for commercial purposes because of the low polymerization activities of such catalyst when subject to the presence of a diolefin monomer.

Japanese Kokai numbers 119,215 (published May 30, 1987); 121,707(published June 3, 1987); and 121,709 (published June 3, 1987) disclose production of soft copolymers variously of ethylene-α-olefin, propylene-α-olefin, butylene-α-olefin, using a metallocene/alumoxane catalyst system wherein the metallocene is a metal salt of a lower alkylene bridged -bis(cyclopentadienyl), -bis(indenyl) or -bis(tetrahydroindenyl) compound. The Japanese Kokai represent that copolymer products may be produced by a gas or liquid phase reaction procedure to have a wide range of properties such as crystallinities from 0.5–60%, while having a molecular weight distribution (MWD) less than 3 with low levels of boiling methyl acetate soluble components.

European Patent Application 206,794 discloses that certain supported metallocene/alumoxane systems, particularly bis(cyclopentadienyl) transition metal metallocenes are useful for polymerizing ethylene to a homopolymer or to a copolymer with an olefin or diolefin for purposes of modifying the clarity or impact properties of the polyethylene polymer product. The patent is directed to a supported metallocene catalyst which may be used in the production of copolymers of ethylene in slurry or gas-phase processes in the presence of small quantities of alumoxane cocatalyst.

Efforts to utilize zirconocene/alumoxane catalyst for the production of olefinic elastomers, such as ethylene-propylene-diene (EPDM), have been reported. To date, however, these reports have not been encouraging to a belief that a zirconocene/alumoxane catalyst system would have a sufficiently high catalyst activity when subject to the presence of a 1,4-hexadiene monomer for commercial utilization in the production of an ethylene with 1,4-hexadiene copolymer. Kaminsky, *J. Poly. Sci.*, Vol. 23, pp. 2151–64 (1985) reports upon the use of a soluble bis(cyclopentadienyl) zirconium dimethyl-/alumoxane catalyst system for toluene solution polymerization of elastomers containing ethylene, propylene and 5-ethylidene-2-norbornene (ENB). Kaminsky employed this catalyst at low zirconium concentrations, high Al:Zr ratios and long reaction times to prepare, in low yields, high molecular weight EPDM elastomers having high ENB incorporation.

Similar to Kaminsky, Japanese Kokai 121,711 (published June 3 , 1987), illustrates the use of a soluble bis(cyclopentadienyl) zirconium monohydride monochloride/alumoxane catalyst system for toluene solution polymerization of ethylene and butene-1 wherein, variously 5-ethylidene-2-norbornene (ENB), 5-vinylidene-2-norbornene (VNB), and dicyclopentadiene (DCPD) were employed as the diene. Japanese Kokai 121,711 further suggests, but does not illustrate, that the zirconocene component of the catalyst system may be a bis(indenyl) zirconium hydride or bis(tetrahydroindenyl) zirconium hydride rather than a bis(cyclopentadienyl) zirconium hydride. Although Japanese Kokai 121,711 suggests that α-olefins other than 1-butene can be employed, it illustrates only the production of an ethylene-butene-1-diene elastomer (EBDM) material in a continuous flow atmospheric pressure reaction.

It is desirable to develop a process for the copolymerization of ethylene with 1,4-hexadiene and the polymerization of ethylene with 1,4-hexadiene and a 1-olefin which would proceed at commercially useful rates of polymer production in the presence of sufficiently small quantities of catalyst such that the product polymer would not require deashing in a subsequent process to remove catalyst residue from the polymer product.

It would be still further desirable that the process provides for a relatively high level of 1,4-hexadiene comonomer insertion, on the order of from about 0.1 to about 10.0 mole % of the polymer product, at 1,4-hexadiene monomer concentrations which do not depress the activity of the catalyst utilized in the process below levels which are in the range of commercial utility. It would be even more desirable that the process be one which is capable of producing the polymer directly in particle form, such as in a gas phase polymerization process wherein the catalyst employed is in solid or supported particulate form.

SUMMARY OF THE INVENTION

This invention comprises a process, using a high activity catalyst, for the production of 1,4-hexadiene-containing polyethylene polymers having a relatively high concentration of 2-butenyl branch chains which react readily with other chemicals to form functionalized polyethylene and which may be cross-linked with ease to form high strength polyethylene. The process of this invention produces a polymer product which is further characterized by having a narrow molecular weight distribution (MWD) and composition distribution (CD).

The process utilizes high activity catalyst, which is of the metallocene/alumoxane type, which comprises a methylalumoxane-bisindenyl zirconium dichloride compound which may be deposited on a dehydrated silica gel support, and is highly active relative to the prior art catalysts in the polymerization of 1,4-hexadiene with ethylene. Moreover, the supported form of the catalyst is suitable for use in the gas-phase polymerization of 1,4-hexadiene with ethylene. Other 1-olefins, such as propylene, butene-1, hexene-1, 4-methyl pentene-1, and the like, may also be included as comonomers in the process of this invention.

DESCRIPTION OF THE PREFERRED EMBODIMENT

The invention relates to a process employing a highly active catalyst including methylalumoxane and a bisindenyl zirconium compound on a dehydrated metal oxide support for the polymerization of ethylene with 1,4-hexadiene or of ethylene with 1,4-hexadiene and a 1-olefin to produce a cross-linkable form of ethylene polymer.

The catalyst employed in this invention comprises a metallocene/alumoxane system. The metallocenes useful in the process of this invention are represented by the general formula:

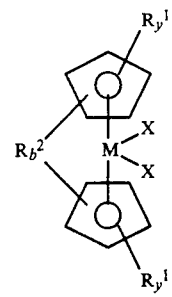

wherein M is zirconium, titanium or hafnium; with zirconium being preferred; the $R^2$ bridging group, if present, is a linear, branched or cyclic alkylene group having from one to six carbon atoms, an alkyl substituted silaalkylene group having from one to two silicon atoms in place of carbon atoms in the bridge, or a $Si_1$--$Si_2$ alkyl substituted silaalkylene group; each $R^1$ independently is a linear or branched hydrocarbyl radical having from one to twenty carbon atoms or a cyclic hydrocarbylene di-radical having carbon atoms joined to different ring positions of the cyclopentadienyl group to form a $C_4$-$C_6$ fused ring system; each X may be hydride, halide, oxygen bridge of a metallocene dimer, or a hydrocarbyl radical such as an aryl group or a linear, branched or cyclic alkyl group; chloride being preferred; "y" is a number from 2 to 4; and "b" is a number 0 or 1 provided at least one $R^1$ is a hydrocarbylene di-radical which forms a $C_4$-$C_6$ fused ring system and otherwise "b" is 1. Exemplary $R^1$ hydrocarbyl radicals are methyl, ethyl, propyl, butyl, amyl, isoamyl, hexyl, isobutyl, heptyl, octyl, nonyl, decyl, cetyl, 2-ethylhexyl, phenyl, and the like. Exemplary $R^2$ hydrocarbylene di-radicals are ethylene, 1,3-propylene, 1,4-butylene and the like. A preferred species of catalyst for use in the process of the invention is that species wherein an $R^1$ group is a cyclic hydrocarbylene which is joined to adjacent ring positions of the cyclopentadiene to provide an fused ring structure, particularly an indenyl ring structure. The preferred metallocene component of the invention process is a metallocene of the formula:

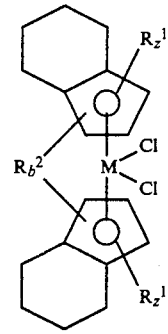

wherein M is zirconium or hafnium; $R^1$ is a linear or branched hydrocarbyl radical having from 1 to 20 carbon atoms; "z" is an integer number from 0 to 2, preferably 0, $R^2$ is as previously described and "b" is 0 or 1. Exemplary $R^2$ linear alkylene radicals are methylene, ethylene, 1,3-propylene, 1,4-butylene, 1,5-pentylene, 1,6-hexylene and the like. Exemplary $R^2$ alkyl substituted silaalkylene groups are dimethylsilaalkylene, methylethyl silaalkylene, diethylsilaalkylene, tetramethyldisilaalkylene, tetraethyldisilaalkylene, and the like. The $R^2$ group may also be an alkyl substituted silaalkylene group, i.e. a bridge composed of a carbon-silicon sequence, e.g. —Si(R')$_2$—C(R")$_2$—wherein R' is lower alkyl and R" is hydrogen or lower alkyl. Exemplary $R^2$ alkyl substituted silaalkylene groups are 1-sila-1,1-dimethylethylene, 2-sila-2,2-dimethylpropylene, 1,3-disila-1,1,3,3-tetramethyl propylene and the like. Preferably $R^2$ is ethylene, dimethylsilanylene or "b" is 0 and $R^2$ is absent. The invention process uses bisindenyl zirconium dichloride as the preferred metallocene.

Methods for preparing the required metallocene component are known in the art, for example, see H.H. Brintzinger, et al, *Jnl. of Organometallic Chem.*, Vol. 288, p. 63 (1985); C.S. Bajgur, W.R. Tikkanen, J.L. Petersen, *Inorg. Chem.*, Vol. 24, pp. 2539-46 (1985).

The alumoxane component of the catalyst system is an oligomeric aluminum compound represented by the general formula (R—Al—O)$_n$, which is a cyclic compound, or R(R—Al—O)$_n$AlR$_2$, which is a linear compound. The alumoxane component is generally a mixture of cyclic and linear compounds. In the general alumoxane formula R is a $C_1$–$C_5$ alkyl radical, for example, methyl, ethyl, propyl, butyl or pentyl and "n" is an integer from 1 to about 50 for the linear compound and at least 3 for the cyclic compound. In the alumoxane component used for the purpose of this invention, R is preferably methyl and preferably "n" averages at least 4.

Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

In the preparation of the catalyst in supported form, care should be taken to dehydrate the support material. The catalyst support may be any finely divided inorganic solid porous material such as talc, silica, alumina, magnesia, titania, zirconia, silica-alumina or mixtures thereof. The preferred support for the catalyst used in the process of the invention is silica. Metal oxides such as silica generally contain acidic surface hydroxyl groups which will react with the alumoxane or metallocene compound. Before use the oxide support should therefore be dehydrated either by thermal or chemical means to remove water and to reduce the concentration of surface hydroxyl groups.

Thermal dehydration of the silica gel may be carried out in vacuum or while purging with a dry inert gas such as nitrogen at a temperature of between about 100° C. to about 1,000° C. and preferably from about 300° C. to about 800° C. Pressure considerations are not critical in the dehydration process. The duration of the thermal treatment may vary from about 1 to 24 hours. However, shorter or longer times may be employed provided that an equilibrium is established with respect to the surface hydroxyl groups.

As an alternative to thermal dehydration, chemical dehydration may be advantageously employed. Chemical dehydration converts all the water and surface hydroxyl groups to inert species. The useful chemical dehydrating agents include, for example, silicon tetrachloride; and chlorosilanes, such as trimethylchlorosilane, dimethylaminotrimethylsilane and the like. Chemical dehydration is accomplished by slurrying the inorganic particulate material in an inert low boiling dry hydrocarbon such as, for example, hexane. During the chemical dehydration reaction, the silica slurry should be maintained in a moisture and oxygen-free atmosphere. A solution of the chemical dehydrating agent in a low-boiling inert hydrocarbon is then added slowly to the silica slurry. During the dehydration reaction, temperatures may range from about 25° C. to about 120° C., however, higher or lower temperatures may be employed. Preferably, the dehydration temperature should be between about 50° C. to about 70° C. The chemical dehydration process should be allowed to proceed until all moisture is removed from the solid support material, as indicated by the cessation of gas evolution. Normally, the chemical dehydration reaction should be allowed to proceed from about 30 minutes to about 16 hours, preferably 1 to 5 hours. Upon completion of the chemical dehydration, the solid material is filtered under a nitrogen atmosphere and washed one or more times with a dry, oxygen-free inert hydrocarbon solvent. The wash solvents and the diluents employed to form the slurry and the solution of chemical dehydrating agent may be selected from any suitable inert hydrocarbon such as, for example, heptane, hexane, toluene, isopentane and the like.

The usual hydrocarbon-soluble metallocenes and alumoxanes are converted to a heterogeneous supported catalyst by depositing said metallocenes and alumoxanes on the dehydrated support material. The order of addition of the metallocene and alumoxane to the support material can vary. For example, the metallocene may first be added to the support material followed by the addition of the alumoxane. Alternatively, the alumoxane and the metallocene may be added to the support material simultaneously. In other cases, the order may be reversed and the alumoxane may be first added to the support material followed by the addition of the metallocene. In accordance with the preferred embodiments of this invention, the alumoxane is dissolved in a suitable inert hydrocarbon solvent and is first added to the support material which is slurried in the same or another suitable hydrocarbon solvent. Thereafter the metallocene is added to the slurry.

In preparation of the supported catalyst, the dehydrated support material as mentioned above, is first slurried in an inert solvent. The same inert solvent or a different inert solvent is also employed to dissolve the metallocenes and alumoxanes. Preferred solvents include various hydrocarbons which are liquid at reaction temperatures and in which the individual ingredients are stable. Illustrative examples of useful solvents include the alkanes such as pentane, iso-pentane, hexane, heptane, octane and nonane; cycloalkanes such as cyclopentane and cyclohexane; and aromatics such as benzene, toluene, ethylbenzene and diethylbenzene. Preferably, the support material is slurried in toluene and the metallocene and alumoxane are each individually dissolved in toluene prior to addition to the support material. The amount of solvent to be employed is not critical, however, the amount should be such as to provide adequate heat transfer away from the catalyst components during reaction and also sufficient to permit mixing. During the preparation of the supported catalyst of this invention, the silica support material is preferably first slurried in toluene. Preferably, the alumoxane solution is then added to the silica slurry at room temperature. The reaction between the alumoxane and the support material is rapid. However, it is desirable that the alumoxane be contacted with the support material for at least about one hour and up to 18 hours or more. The metallocene solution is then added to the reaction product of the alumoxane and the silica support. The reaction of the alumoxane, the metallocene and the support material is evidenced by its exothermic nature and a color change.

At all times, the individual ingredients as well as the recovered catalyst component must be protected from oxygen and moisture. Therefore, the reactions must be performed in an oxygen and moisture free atmosphere and the catalyst must be recovered in an oxygen and moisture free atmosphere. Preferably, therefore, the reactions should be performed in the presence of an inert dry gas such as, for example, nitrogen. The recovered solid catalyst should be maintained under a nitrogen atmosphere.

Upon completion of the reaction of the metallocene and alumoxane with the silica support material, the solid catalyst may be recovered by any well-known technique. For example, the solid catalyst can be recovered from the solvents by vacuum evaporation or decantation. The catalyst is thereafter dried under a stream of pure dry nitrogen or dried under vacuum.

The amount of alumoxane and metallocene usefully employed in the preparation of the solid supported catalyst can vary over a wide range. The concentration of the alumoxane added to the essentially dry, support can be in the range of from about 0.1 to about 100 millimoles per gram of support. Preferably, the alumoxane concentration will be in the range of 1 to 10 millimoles per gram of support. The amount of metallocene added should be such as to provide an aluminum to zirconium mole ratio of from about 10 to about 10,000. Desirably, the aluminum to zirconium ratio should be the range from about 10 to about 1,000, preferably 20 to 200 and most preferably 20 to 100.

The specific particle size, surface area, pore volume, and number of surface hydroxyl groups characteristic of the silica support are not critical to its utility in the practice of the invention. However, since such characteristics determine the amount of silica desirable to employ in preparing the catalyst compositions, and also affect the properties of polymers formed with the aid of the catalyst compositions, these characteristics must frequently be taken into consideration in choosing the silica support for a particular use. For example, when the catalyst composition is to be used in a gas-phase polymerization process, the silica support used in preparing the catalyst composition should have a particle size that is suitable for the production of a polymer having the desired particle size. In general, optimum results are usually obtained by using silica having an average particle size in the range of about 30 to 600 microns, preferably about 30 to 100 microns; a surface area of about 50 to 1,000 square meters per gram, preferably about 100 to 400 square meters per gram; and a pore volume of about 0.5 to 3.5 cc per gram, preferably about 0.5 to 2 cc per gram.

The polymerization may be conducted in a solution, slurry or gas-phase process. These processes are generally carried out at temperatures in the range of about 0° C. to 200° C. and under pressure of 10 to 1,000 psig.

Gas-phase polymerization may be performed in a stirred or fluidized bed of catalyst in a pressure vessel adapted to permit the separation of product particles from unreacted gases. During this process, ethylene, 1,4-hexadiene, a 1-olefin if desired, hydrogen and an inert diluent gas such as nitrogen may be introduced and circulated to maintain the particles at a temperature of between 25° C. to 120° C. In the production of 1,4-hexadiene-containing ethylene polymers by the process of this invention, only a small amount of 1,4-hexadiene is needed. Thus, the small proportion of 1,4-hexadiene may range from about 0.01 mole % to about 10 mole % and preferably from about 0.01 mole % to about 5 mole %. A 1-olefin may be added in concentrations from about 0 mole % to about 50 mole % and preferably from about 0 mole % to about 40 mole %. The ethylene concentration may range from about 20 mole % to about 80 mole % and preferably from about 30 to about 60 mole %. The balance of the gas phase may comprise inerts, diluents and the like. Minor amounts of triethylaluminum may be added as needed as a scavenger of water, oxygen and other impurities. Polymer product may be withdrawn continuously or semi-continuously at such a rate as to maintain a constant product inventory in the reactor. After polymerization and deactivation of the catalyst, the product polymer may be recovered by any suitable means. In commercial practice, the polymer product may be recovered directly from the gas-phase reactor, freed of residual monomer with a nitrogen purge, and used without further deactivation or catalyst removal. The polymer obtained may then be extruded into water and cut into pellets or other suitable comminuted shapes. Pigments, antioxidants and other additives known in the art may be added to the copolymer product.

The polymerization may also be carried out as a batchwise slurry polymerization or as a continuous slurry polymerization. The procedure of continuous process slurry polymerization is preferred, in which event ethylene, 1,4-hexadiene, 1-olefin if desired, solvent, catalyst and scavenger are continuously supplied to the reaction zone in amounts equal to the copolymer product, ethylene, 1,4-hexadiene, 1-olefin when utilized, solvent, catalyst and scavenger removed from the reaction zone in the product stream.

Without limiting in any way the scope of the invention, one means for carrying out the process of the present invention is as follows: in a stirred-tank reactor liquid isobutane is introduced. Feed ethylene gas, 1,4-hexadiene and 1-olefin if desired are introduced either into the vapor phase of the reactor, or sparged into the liquid phase as well known in the art. The reactor contains a liquid phase composed substantially of liquid hydrocarbon solvent together with dissolved ethylene gas, 1,4-hexadiene and 1-olefin when it is utilized and a vapor phase containing vapors of all components. Catalyst is introduced via nozzles in either the vapor or liquid phase. The reactor temperature and pressure may be controlled via reflux of vaporizing solvent (autorefrigeration), as well as by cooling coils, jackets, etc. The polymerization rate is controlled by the rate of catalyst addition, or by the concentration of catalyst manipulated separately.

The molecular weight of the polymer product obtained in accordance with this invention can vary over a wide range of from 1,000 to 1,000,000. The process provides a product having a narrow molecular weight distribution (MWD) and CD.

The polymers produced by the process of this invention are characterized as having a "narrow" MWD as indicated by a polydispersity below 3.0. The MI of a polymer, which is also a measure of its molecular weight, is measured as described in ASTM D 1238 Condition E. Briefly, the method measures the rate of extrusion of a resin through an orifice of specified diameter and length at 190° C. and under a load of 2,160 grams (about 43.25 psi). The MI is inversely related to the polymer molecular weight because a higher molecular weight polymer will require greater shear forces to induce it to flow, i.e. it will flow less readily than a lower molecular weight polymer. Thus, a higher molecular weight polymer will have a lower MI.

The process of the present invention is illustrated by the following examples which are for illustrative purposes only and do not in any way limit the scope of the invention.

CATALYST PREPARATION

Catalyst A

A 100 gram quantity of 800° C. silica gel (Davison 948) was charged into an one-liter three-neck flask equipped with a magnetic stirring bar. A 330 ml aliquot of methyl alumoxane (MAO) in a toluene (10% MAO) solution was then charged into the flask followed by a 250 ml of toluene solvent. The mixture was allowed to react at ambient temperature for one hour. A 2.5 gram quantity of bisindenylzirconium dichloride, slurried in 40 ml of toluene, was then added to the flask and the mixture was allowed to react at ambient temperature for one hour. The mixture in the flask was heated at 65° C. in an oil bath while dry nitrogen gas was purged through the flask to remove the solvent. The heating and nitrogen purging were stopped when the mixture in the flask solidified. The mixture was then dried completely under vacuum to form a free-flowing powder.

CATALYST PREPARATION

Catalyst B

A 800 gram quantity of silica gel and a 2700 ml aliquot of MAO/toluene solution (10%) were placed in a two-gallon reactor and allowed to react at ambient temperature for one hour. A 21.6 gram quantity of bisindenylzirconium dichloride slurried in 300 ml of toluene was added into the reactor and the mixture was allowed to react at 65° C. for 30 minutes. The reactor was then heated at 75° C. while nitrogen gas was purged through the reactor to remove the solvent. The heating and nitrogen purging were stopped when the mixture in the reactor turned into a free-flowing powder.

CATALYST PREPARATION

Catalyst C

The procedure for producing Catalyst B was repeated with the exception that bis(n-butylcyclopentadienyl)zirconium dichloride was used instead of bisindenylzirconium dichloride.

EXAMPLE 1

A polymerization reaction was conducted in a 4-inch diameter fluidized bed gas-phase reactor. Ethylene, butene-1, 1,4-hexadiene, and nitrogen were fed continuously into the reactor to maintain the desired gas composition. Catalyst A was added periodically into the reactor to maintain a constant production rate. Product was periodically removed from the reactor to maintain a desired bed weight of 800 g. The polymerization conditions and product properties are shown in Table I.

EXAMPLE 2

A polymerization reaction was conducted in a 16-inch diameter fluidized bed gas-phase reactor. Ethylene, butene-1, 1,4-hexadiene, and nitrogen were fed continuously into the reactor to maintain the desired gas composition. Catalyst B was added periodically to the reactor to maintain a constant production rate. Product was periodically removed from the reactor to maintain a desired bed weight of from about 100 to about 140 pounds. The polymerization conditions and product properties are shown in Table II.

EXAMPLE 3 (COMPARATIVE)

The polymerization reaction procedure described in Example 2 was repeated with the exception that Catalyst C was used instead of Catalyst B. Catalyst C exhibited low activity in the presence of 1,4-hexadiene. Less than 50 grams/hour of polymer was produced.

Although the invention has been described with reference to its preferred embodiments, those of ordinary skill in the art may, upon learning this disclosure, appreciate changes and modifications that may be made which do not depart from the scope and spirit of this invention as described above or claimed hereafter.

TABLE I

| Gas Phase Polymerization Using Catalyst A | |
|---|---|
| Temperature (°C.) | 63 |
| Total Pressure (psia) | 300 |
| Gas Velocity (ft/sec) | 0.7 |
| Ethylene Concentration (mole %) | 50 |
| Butene-1 Concentration (mole %) | 7 |
| 1,4-hexadiene Concentration (mole %) | 1 |
| Nitrogen Concentration (mole %) | 42 |
| Catalyst Feeding Rate (g/hr) | 1 |
| Production Rate (g/hr) | 100 |

| | Product Properties | | |
|---|---|---|---|
| Sample No.[3] | Collecting Time (hr)[1] | MI[2] (dg/min) | Density |
| 1 | 2 | 21.35 | 0.9211 |
| 2 | 10 | 17.79 | 0.9237 |

Notes to Table I:
[1]Hours after three bed weights (of 800 g) had been removed from the reactor following start-up.
[2]MI was determined in accordance with ASTM test D1238 with 2.1 kg weight.
[3]The diene contents of these products determined by IR spectrum are around 2.8 mole %.

TABLE II

| Gas Phase Polymerization Using Catalyst B | |
|---|---|
| Temperature (°C.) | 60 |
| Total Pressure (psia) | 300 |
| Gas Velocity (ft/sec) | 1.8 |
| Ethylene Concentration (mole %) | 42 |
| Butene-1 Concentration (mole %) | 7 |
| 1,4-hexadiene Concentration (mole %) | 0.28 |
| Hydrogen Concentration (ppm) | 280 |
| Nitrogen Concentration (mole %) | balance |
| Catalyst Feeding Rate (g/hr) | 11 |
| Production Rate (g/hr) | 900 |

| | Product Properties | | |
|---|---|---|---|
| Sample No.[3] | Collecting Time (hr)[1] | MI[2] (dg/min) | Density |
| 1 | 7 | 31.74 | 0.8917 |
| 2 | 19 | 29.35 | 0.8924 |
| 3 | 27 | 28.16 | 0.8925 |
| 4 | 39 | 30.69 | 0.8926 |
| 5 | 47 | 31.83 | 0.8928 |

TABLE II-continued

| 6 | 59 | 27.52 | 0.8943 |

Notes to Table II:
[1] Hours after three bed weights (of about 100–140 pounds) had been removed from the reactor following start-up.
[2] MI was determined in accordance with ASTM test D1238 with 2.1 kg weight.
[3] The diene contents of these products are around 1.7 mole %, and the MWD or polydispersity of these products are around 1.7.

I claim:

1. A process for polymerizing ethylene and 1,4-hexadiene comprising:

(i) contacting ethylene and 1,4-hexadiene with a supported catalyst system comprising the reaction product of a metallocene and methylalumoxane deposited on an inorganic porous support, said metallocene being of the formula:

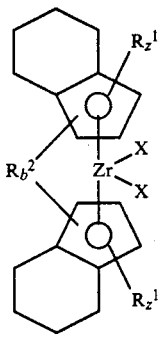

wherein $R^2$ bridging group is a linear, branched or cyclic alkylene group having from one to six carbon atoms, an alkyl substituted silaalkylene group having from one to two silicon atoms in place of carbon atoms in the bridge, or a $Si_1$–$Si_2$ alkyl substituted silaalkylene group; "b" is a number 0 to a; each $R^1$ independently is a linear or branched hydrocarbyl radical having from one to twenty carbon atoms; "z" is an integer number from 0 to 2; and each X is a hydride, halide, oxygen bridge or a metallocene dimer, or a hydrocarbyl radical;

(ii) reacting said ethylene and 1,4-hexadiene in the presence of said catalyst to produce a polymer having a diene content of from about 0.1 to about 10 mole %; and (iii) recovering said polymer.

2. The process of claim 1 further comprising including 1-olefin as a comonomer with ethylene and 1,4-hexadiene in the polymerization process.

3. The process of claim 2, wherein 1,4-hexadiene is in the gas phase in an amount of from about 0.01 mole % to about 10 mole %, based upon the total number of moles of ethylene, 1,4-hexadiene, 1-olefin and other gases in the gas phase.

4. The process of claim 3, wherein said catalyst system comprises the reaction product of a bisindenyl zirconium dichloride and methylalumoxane.

5. The process of claim 1, wherein said X is a halide.

6. The process of claim 5, wherein the halide is chloride.

7. The process of claim 1, wherein "z" is 0.

8. The process of claim 1, wherein "b" is 0.

9. The process of claim 1, wherein said X is an aryl group or a linear, branched or cyclic alkyl group.

10. The process of claim 1, wherein said inorganic porous support is silica.

11. The process of claim 1, wherein "z" and "b" are 0.

12. The process of claim 1, wherein said contacting and reacting take place in the gas phase.

13. The process of claim 1, wherein said contacting and reacting take place in the gas phase.

* * * * *

UNITED STATES PATENT OFFICE
CERTIFICATE OF CORRECTION

Patent No. 5,017,665                    Dated May 21, 1991

Inventor(s)   Main Chang

It is certified that error appears in the above-identified patent and that said Letters Patent is hereby corrected as shown below:

Col. 11, claim 1, line 13, change "0 to a" should read --0 or 1--.

Signed and Sealed this

Twenty-fourth Day of August, 1993

*Attest:*

BRUCE LEHMAN

*Attesting Officer*   Commissioner of Patents and Trademarks